(12) United States Patent
Wall

(10) Patent No.: US 8,443,104 B2
(45) Date of Patent: May 14, 2013

(54) ROUTING ENGINE WITH FILTERING CAPABILITIESS

(75) Inventor: Jeffrey S. Wall, Dallas, TX (US)

(73) Assignee: IntelePeer, Inc., San Mateo, CA (US)

( * ) Notice: Subject to any disclaimer, the term of this patent is extended or adjusted under 35 U.S.C. 154(b) by 147 days.

(21) Appl. No.: 13/227,237

(22) Filed: Sep. 7, 2011

(65) Prior Publication Data

US 2013/0060961 A1 Mar. 7, 2013

(51) Int. Cl.
*G06F 15/173* (2006.01)

(52) U.S. Cl.
USPC ........... 709/238; 709/202; 709/203; 709/239; 709/240; 705/26.4

(58) Field of Classification Search .................. 709/203, 709/224–234, 238; 705/26.4
See application file for complete search history.

(56) References Cited

U.S. PATENT DOCUMENTS

2012/0116912 A1* 5/2012 Moran ......................... 705/26.4

* cited by examiner

*Primary Examiner* — Yves Dalencourt
(74) *Attorney, Agent, or Firm* — DLA Piper LLP (US)

(57) ABSTRACT

A routing engine functions to respond to a request for routing options for a communication session from a querying node by providing a list of routing options. The original request includes signaling information that is utilized by the routing engine to determine a preliminary list of routing options that identifies vendors capable of handling the communication session. Pre-defined routing definitions may be applied to alter the list of vendors as identified in the preliminary list. Filtering processes may be applied to remove undesirable vendors from the preliminary routing options, resulting in a list of routing options for the communication session. The preliminary list may be ordered according to some parameter, and when a filtering process is applied the process may end upon reaching a first non-compliant vendor.

33 Claims, 10 Drawing Sheets

```
<?xml version="1.0"?>
<!-- SoftCP LCR Routes -->
<LCR>
<tier id="GLDL">
<country id="1">
<code id="201007"><list>CVM,VZY,NV2,PA3,GXG,TN8,SCP</list></code>
<code id="201032"><list>VZY,NV2,TN8,SCP,CVM,GO2,NBG,GRX,PMT,PAE,L3X</list></code>
<code id="201040"><list>CVM,BBM,VZY,PAE,GO2,NV1,SCP,L3X,PMK</list></code>
<code id="201200"><list>MMP,PML,ANT,KWK,NB2,CVM,PA3,CVM,PA3K</list></code>
<code id="20120309999"><list>PML,ANT,MMP,KWK,CVWK</list></code>
<code id="201202"><list>GXG,BOT,ATM,GNZ</list></code>
<code id="201203"><list>KWK,BBM,ANT,VZY,GO2,PMT,TN8,SMP,ZSS,GKG</list></code>
-- # Routing information truncated.
</country>
<country id="44">
<code id="7"><list>PA3,BOT,TNR,SCP</list></code>
<code id="default"><list>VZY,NV2,TN8,SCP,PMT,PAE,L3X</list></code>
</country>
<country id="default">
<code id="default"><list>TN8,SCP,XOT,PAE,L3X</list></code>
</country>
</tier>
</LCR>
```

FIG. 3

```
<?xml version="1.0"?>
<!-- SoftCP LCR Routes -->

<LCR>
  <revenue id="CRCT_A">
    <country id="1">                                    Billable units of revenue for a call to
      <code id="201007"><units>800</units></code>       201007.  ← 710
      <code id="201032"><units>1250</units></code>      ← 712
      <code id="201040"><units>520</units></code>       ← 714
      <code id="201200"><units>990</units></code>       ← 716
      <code id="201202"><units>325</units></code>       ← 718
      <code id="201203"><units>801</units></code>       ← 720
      <code id="201202Z000"><units>995</units></code>   ← 722
...# Routing Information Truncated.
    </country>
  </revenue>
</LCR>
```

FIG. 7

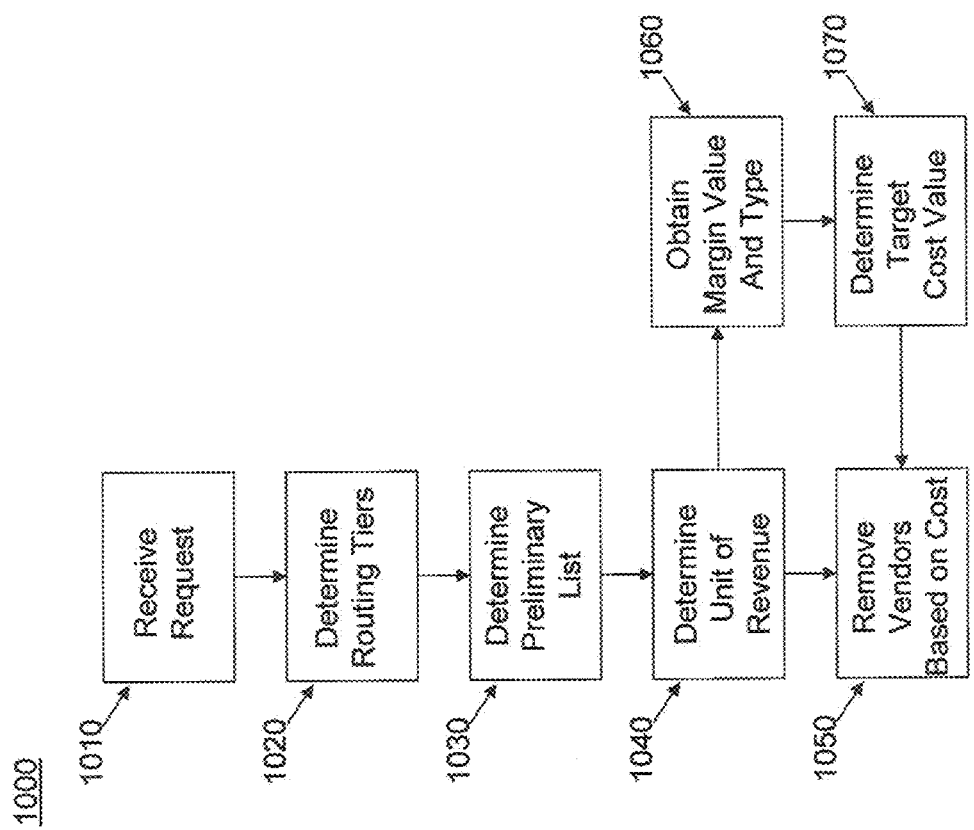

US 8,443,104 B2

ROUTING ENGINE WITH FILTERING CAPABILITIESS

TECHNICAL FIELD

This application is directed to a routing engine for communication architectures. More particularly, this application is directed to a routing engine that employs filtering operations to achieve routing options to be used for establishing and maintaining communication sessions.

BACKGROUND

In a communication architecture in which communication sessions are initiated and established, a querying node may query a routing engine to provide a list of routing options including available vendors or carriers capable of handling a communication session. With the list of routing options provided by the routing engine, the querying node is able to select a vendor to establish and maintain the communication session.

The routing engine may determine or otherwise obtain a list of available vendors and may manipulate the list to meet pre-defined criteria, such as parameters desired by a customer. Typical routing engines may, for example, order the list of available vendors based on cost or quality. Typical routing engines may create the list of routing options based on static data provisioned to the routing engines. If a later determination shows that a particular vendor is experiencing quality issues, for example, then that vendor may be removed from subsequent lists of routing options without further evaluation or subsequent reconsideration.

Moreover, routing engines may perform an analysis operation in which a desired parameter is compared against a parameter value for each vendor. Such an operation for each vendor in the list of available vendors expends large amounts of time, during which the querying node, as well as the customer, are waiting for the list of routing options.

Thus, there is a need for an improved routing engine that dynamically and efficiently evaluates vendor parameters to create a list of routing options that accurately reflect the vendors' capabilities and that meet the customers' requirements.

SUMMARY

A method is provided for creating a list of routing options for a communication session. A request for routing options for the communication session for a customer is received from a requesting node at a routing engine. The request includes signaling information related to the communication session. The routing engine determines routing tiers that are based on the signaling information, each representing a call jurisdiction for the communication session and identifying vendors capable of handling the communication session. The routing engine applies pre-defined routing tier definitions to alter, add, or remove routing tiers, resulting in a set of routing tiers. Preliminary routing options that include vendors are identified by the set of routing tiers. Filtering processes are applied to remove undesirable vendors from the preliminary routing options, resulting in a list of routing options for the communication session.

Another method is also provided for creating a list of routing options for a communication session. A request for routing options for the communication session for a customer is received from a requesting node at a routing engine. The routing engine further receives an ordered list of preliminary routing options. A desired parameter associated with the customer and related to criteria acceptable by the customer is determined, and is applied to the ordered list of preliminary routing options to determine a point in the ordered list at which the desired parameter is not in compliance. A list of routing options including those from the ordered list that precede the determined point is created.

Yet another method is provided for creating a list of routing options for a communication session. The list of routing options are based on cost and revenue. A request for routing options for the communication session to a destination for a customer is received from a requesting node at a routing engine. The request includes signaling information related to the communication session. A list of preliminary routing options, including vendors where each vendor is associated with a cost value representing a cost in units required to complete the communication session to the destination, is determined. A unit of revenue associated with the customer is also determined. Vendors from the list of preliminary routing options whose cost exceeds the unit of revenue associated with the customer are removed from the list with the remaining preliminary routing options comprising a list of routing options.

A routing engine is provided for creating a list of routing options for a communication session. The routing engine includes a communication interface configured to receive a request for routing options for the communication session for a customer. The request includes signaling information related to the communication session. The communication interface is further configured to receive a list of preliminary routing options that includes vendors capable of handling the communication session. An analyzer engine is configured to access filtering parameters that are associated with the customer and that are related to criteria acceptable by the customer. The analyzer engine is further configured to apply the filtering parameters to the list of preliminary routing options and to determine vendors in the list that are not in compliance with the filtering parameters. The routing engine further includes a compiler engine that is configured to create a list of routing options that includes the vendors in the list of preliminary routing options that are in compliance with the filtering parameters.

BRIEF DESCRIPTION OF THE DRAWINGS

The foregoing summary and the following detailed description are better understood when read in conjunction with the appended drawings. Representative examples are shown in the drawings. However, it is understood that the examples are not limited to the specific methods and instrumentalities depicted herein. In the drawings:

FIG. 3 is a representation of a tier load file.

FIG. 7 is a representation of a revenue tier definition.

FIG. 10 is a flowchart illustrating a method of a revenue and cost filtering process for creating a list of routing options for a communication session.

DETAILED DESCRIPTION

A routing engine is an application server utilized in a communication architecture in which communication sessions are initiated, established, and handled. A querying node may query a routing engine requesting a list of routing options including available vendors or carriers capable of handling a communication session. With the list of routing options provided by the routing engine, the querying node, or another node, is able to select a vendor to establish and maintain the communication session. The list of routing options for the querying node may be ordered according to some criteria, such as cost, so that the querying node may follow the ordered list in attempting to establish and maintain the communication session.

Figure 1:
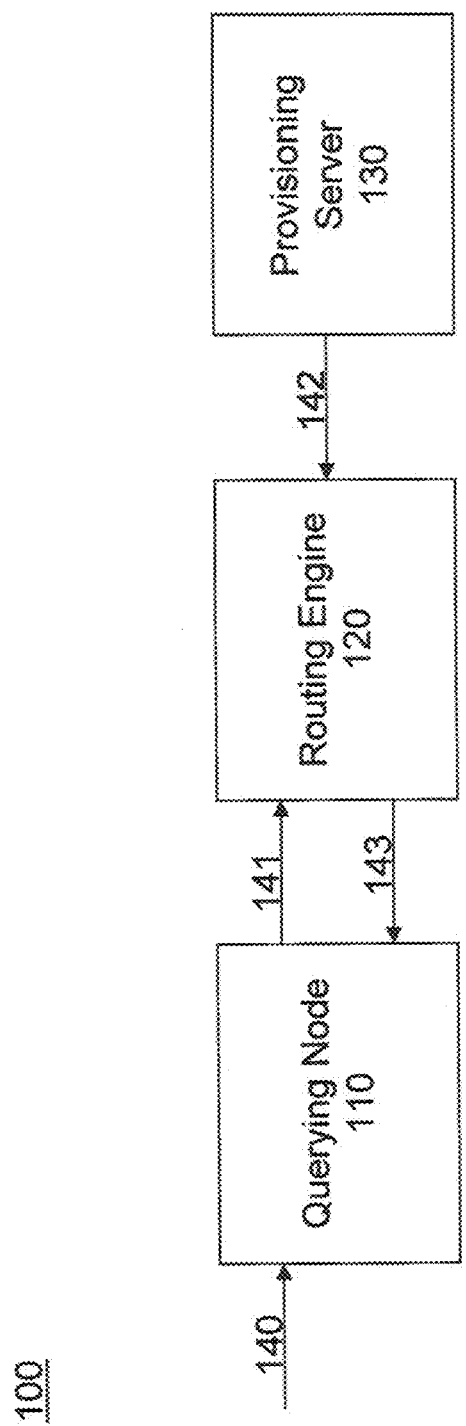
FIG. 1 is a block diagram illustrating a routing engine implemented in a system that establishes and handles communication sessions.

With reference to FIG. 1, a block diagram of a system 100 that includes a routing engine 120 is illustrated. The system generally operates to establish and handle communication sessions. In addition to the routing engine 120, a querying node 110 and a provisioning server 130 are provided. The routing engine 120, the querying node 110, and the provisioning server 130 may include SIP (Session Initiation Protocol) interfaces or SUA (SCCP (Signaling Connection Control Part) User Adaptation Layer) interfaces for communicating with one another and with other nodes or engines with SIP or SUA protocols.

The querying node 110 receives a request for a communication session (140). The request may be initiated by a customer (not shown), for example, or may be initiated by another node (not shown) on behalf of the customer. The querying node 110 queries the routing engine 120 to request routing options for the communication session for the customer (141). The request for routing options may include signaling information including, for example, a trunk group number, a local routing number, a called number, and a calling number. Other information may be included as part of the signaling information. The signaling information may be used to determine a call jurisdiction, which ultimately is associated with a routing tier for use in determining routing options.

The provisioning server 130 pushes, based on established commands, preliminary routing options or related information that enables the routing engine 120 to determine the preliminary routing options for the requested communication session (142). The push of data to the routing engine 120 may occur periodically or on command and may not be related to a particular request from a querying node 110 (i.e., the push of data may not necessarily occur in response to a particular request). The preliminary routing options may be based on the called number, which is part of the signaling information. The preliminary routing options may be in the form of an ordered list, for example. A preliminary routing option may include a vendor that is capable of handling (i.e., establishing and maintaining) the communication session. Along with the vendor or related information, the data pushed by the provisioning server 130 may include other pertinent information, such as the cost that each vendor charges for handling the communication session and/or the quality level that will be provided by each particular vendor, for example.

With the information related to the preliminary routing options for the communication session, the routing engine 120 may apply various types of filtering processes to the preliminary routing options with the goal of eliminating routing options that do not meet certain criteria deemed necessary for or preferred by the customer or for a trunk group to which an endpoint (i.e., session initiator or session destination) of the communication session belongs. Information related to the criteria for the customer and/or trunk group for the filtering process may be provided in the original request to the routing engine 120 (141) with the signaling information or may be provided to the routing engine 120 in a separate query, for example. An example filtering process may include first removing routing options that have been designated as invalid or excluded for the incoming trunk group or the customer, followed by removing routing options that fail to meet quality standards established for the customer, and finally removing routing options that exceed a desired cost limit for the customer. By performing the filtering processes, the routing engine 120 creates routing options for the communication session, which may be in the form of a list or other convenient format. The routing engine 120 provides the routing options to the querying node 110 (143). The routing options provided from the routing engine 120 to the querying node 110 may include a switch identification number or a trunk group identification number, for example, depending on the applicable signaling protocol.

Figure 2:
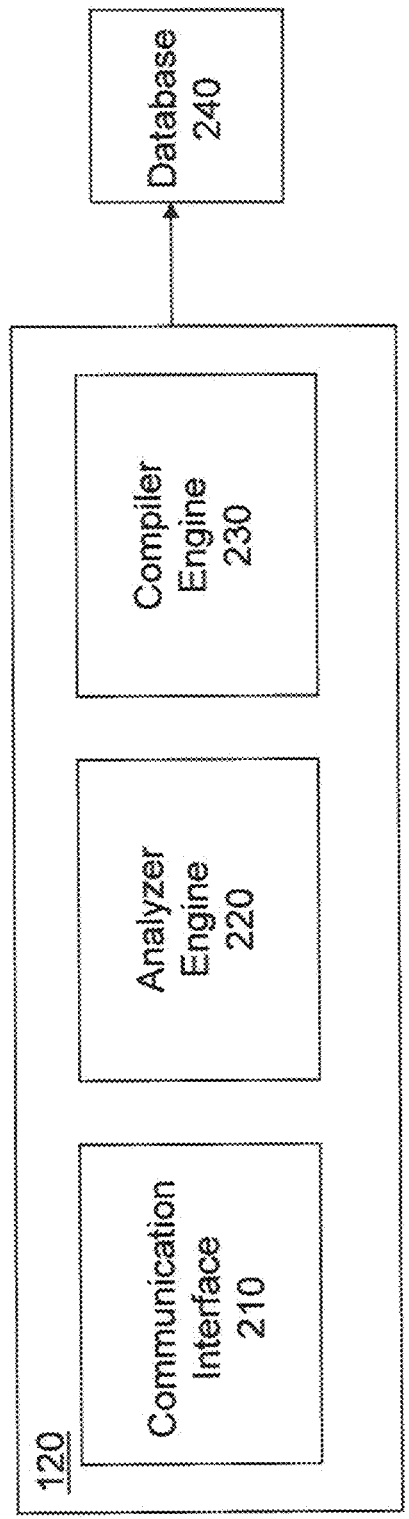
FIG. 2 is a block diagram of an architecture of a routing engine.

FIG. 2 provides an example architecture for the routing engine 120. The routing engine 120 includes several engines, or processors, that function to provide routing options to a querying node, such as the querying node 110. The routing engine 120 includes a communication interface 210, an analyzer engine 220, and a compiler engine 230.

Each of the components 210, 220, and 230 of the routing engine 120 may include one or more components/devices, at least one of which comprises a memory for storing instructions and at least one processor for executing the instructions, where the execution of the instructions causes the components to function as described in further detail below. Such components/devices may include, but are not limited to, servers, personal computers, handheld computing devices, routers, equipment, hardware, and/or other computing devices.

The communication interface 210 enables communication between the routing engine 120 and the querying node 110 and the provisioning server 130, as well as other components, such as, but not limited to, a database 240. The database 240 may contain various information, such as, but not limited to, information related to the criteria for the customer and/or trunk group for the filtering processes. The database 240 may also contain the preliminary routing options data or related information that enables the routing engine 120 to determine the preliminary routing options, as further described below. Some or all portions of the database 240 may be contained within the routing engine 120.

The communication interface 210 is configured to receive a request for routing options for a communication session for a customer from the querying node 110. The request generally includes signaling information related to the communication session, where the signaling information enables the routing engine 120 to generate an applicable list of routing options. The communication interface 210 is further configured to receive information related to various preliminary routing options for the communication session from data pushed from, for example, the provisioning server 130. The list of preliminary routing options may identify vendors that are capable of handling the communication session.

The analyzer engine 220 is configured to access filtering parameters associated with the customer and related to criteria acceptable by the customer for the communication session. The analyzer engine 220 may receive the relevant filtering information via the communication interface 210 from the querying node 110 with the signaling information or in a separate message, from the database 240, for example, or from a combination thereof. The analyzer engine 220 then applies the filtering parameters to the list of preliminary routing options to determine vendors that do not satisfy the filtering parameters (i.e., those that are not in compliance with the filtering parameters) and should thus not be provided to the querying node 110.

The compiler engine 230 is configured to create a list of routing options from the analysis of the preliminary routing options performed by the analyzer engine 220. In particular, the list of routing options may include those vendors from the list of preliminary routing options that are in compliance with the filtering parameters.

As noted above, the signaling information, such as the called number, may be used to determine a call jurisdiction, which is in turn used to determine the preliminary routing options. A particular communication session may be classified as belonging to one of a local jurisdiction, an intra-area jurisdiction, an unknown jurisdiction, an inter-area jurisdiction, or an international calling number jurisdiction. Once the jurisdiction for the communication session is determined, the determined jurisdiction is used in combination with the trunk group number from the signaling information to determine a routing tier for the communication session. This determination may be done by, for example the analyzer engine 220. The routing tier represents a jurisdiction, and routing tiers are assigned to one or more trunk groups.

With the routing tier and the local routing number or the called number, the preliminary routing options may be determined. Tier load files may be loaded into memory (i.e., the database 240 or a memory component of the routing engine 120) when a user issues a command via the provisioning server 130 to load routing tiers. The command may indicate specific routing tiers that are to be loaded. Routing tiers may also be loaded when a restart operation occurs. Tier load files are a representation of a routing tier and are created by a user to provide preliminary routing options for a communication session. An example tier load file 300 is provided in FIG. 3. The routing tier 310 is indicated, and parameters of the local routing number or the called number are used to determine the preliminary routing options, as shown in FIG. 3. The parameters of the local routing number or the called number may include country identity 320 and destination code 330. The preliminary routing options may be in the form of a list of preliminary routing options 340 (i.e., a preliminary carrier list), indicating carriers that are capable of establishing and maintaining the communication session. Entries in the list of preliminary routing options 340 may be in the form of carrier codes that identify the respective carrier. For the querying node 110 and the routing engine 120, or another node, utilizing the list of preliminary routing options 340, each carrier code may be associated with a switch identifier and a trunk group identifier.

If a routing tier is not identified when the routing engine 120 analyzes the routing tiers for an applicable routing tier for a communication session, a default tier may be used as a fallback solution. The default tier may be defined to include various routing options. If the list of preliminary routing options does not yield any results (i.e., no carriers identified), then a negative response may be provided to the querying node 110 from the routing engine 120. The querying node 110 may then proceed by contacting another routing engine, by utilizing internal processing capabilities to determine routing options, or by performing another action. Alternatively, the routing engine 120 may access a default tier for the querying node 110, where the default tier includes a list of preliminary routing options 340 to be provided to the querying node 110. Default routing enables a user to specify one or more routing tiers to be used when other routing tiers have failed to return a list of routing options. A default routing tier may be established for a particular call jurisdiction.

Various additional and optional routing features may be implemented to the list of preliminary routing options 340 (i.e., preliminary carrier list) to include or exclude routing tiers for determining the list of routing options. The routing engine 120, (i.e., the analyzer engine 220) may apply pre-defined routing tier definitions by altering, adding, and/or removing routing tiers based on the pre-defined routing tier definitions. The result of applying the pre-defined routing tier definitions may be referred to as a set of routing tiers.

One such optional feature is priority tier routing, in which certain routing tiers are defined as priority tiers. If a match exists between priority tier routes and a called number that is part of the signaling information for a communication session, as determined by the routing engine 120, routing options that are defined for the matched priority tier route are presented at the beginning of the list of preliminary routing options, denoting their preferred status. After the priority tier route matching, the typical routing tier identification is performed, the results of which are appended to the priority tier routes at the beginning of the list of preliminary routing options. Priority tier routing is beneficial when a particular carrier has specific numbers for which the desired routing destination is known.

Another example of an optional routing feature is exception routing, in which modifications are made to routing tiers without requiring the tier load file to be reloaded. Such modifications may be implemented when there is a known network issue that is desired to be resolved on a temporary basis. The modification of the routing tier allows users to create routing exception entries that take priority over the routing information that exists within a routing tier in the tier load file. Exception routes for a routing tier are loaded after the routing tier information in the tier load file has finished loading. The routing engine 120 checks for a match with the called number and the exception routes. If a match is found, the exception routes are applied. If no match is found, then the tier routing is applied.

Yet another example of an optional routing feature is inherit routing. An inherit tier is a reference within a routing tier to another routing tier that may be used if routing data is not found within the routing tier that was initially identified.

As noted above, with the application of the pre-defined routing tier definitions, a set of routing tiers is identified from which a list of preliminary routing options may be determined. For example, after the routing tiers have been adjusted to account for the pre-defined routing tier definitions, the list of preliminary routing options may be identified from one or more applicable tier load files 300.

In addition to the various optional routing features discussed above that are used to alter, include, and/or exclude routing tiers for determining the list of routing options, the routing engine 120 (i.e., the analyzer engine 220) may employ a filtering process, as mentioned above, to the list of preliminary routing options for the communication session. The filtering process serves to eliminate undesirable or unwanted routing options from the list of preliminary routing options that are the result of the routing tier implementations described above. Example filtering processes include skip filtering, quality filtering, exclusions, and dynamic revenue and cost filtering.

Figure 4:
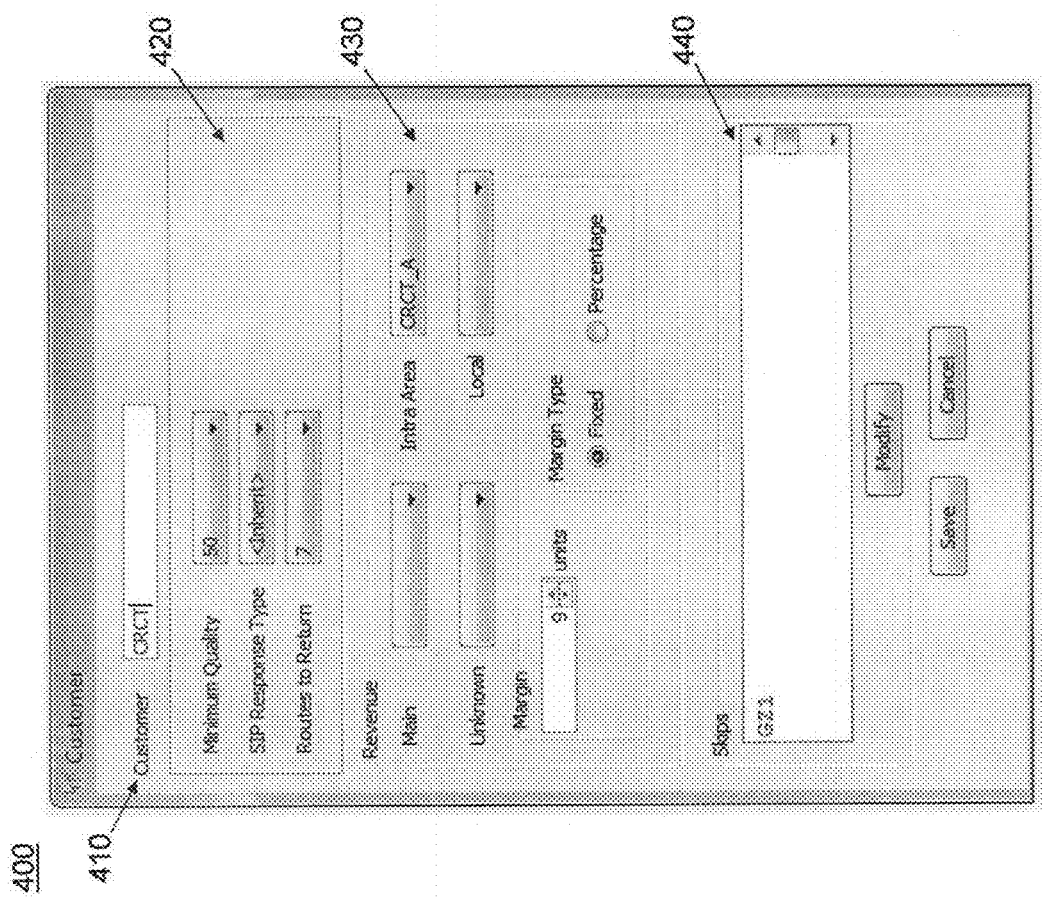
FIG. 4 is a user interface for creating and modifying customer definitions.

Customer definitions may be created to establish certain criteria and settings for a particular customer, which may be used in one or more of the filtering processes further described below. FIG. 4 provides an example customer user interface 400 for creating and modifying customer definitions. The customer is identified in field 410.

Skip filtering involves specifying carriers that are not to be included in the final list of routing options. Carriers may be included in this category for a variety of reasons, such as user preference. Skip filtering may be employed at the trunk group level or the customer level. At the trunk group level, any carrier included in a skip list is removed from the preliminary routing options so as not to be included in the final list of routing options. At the customer level, a customer identity may be referenced in a trunk group definition, and the referenced customer skip list is obtained. Each customer may create their skip list when creating their customer definitions. For example, referring back to the customer user interface 400 of FIG. 4, the section 440 provides a means for a customer to specify carriers to be included in their skip list. At the customer level, as at the trunk group level, any carrier included in a skip list is removed from the preliminary routing options so as not to be included in the final list of routing options.

Quality filtering involves identifying a quality assessment value for a carrier destination and removing routing options whose quality assessment value does not meet the minimum quality value defined by the customer. The customer may define the minimum desired quality value in section 420 of the customer user interface 400 by entering the desired value in the "minimum quality" field.

Figure 5:
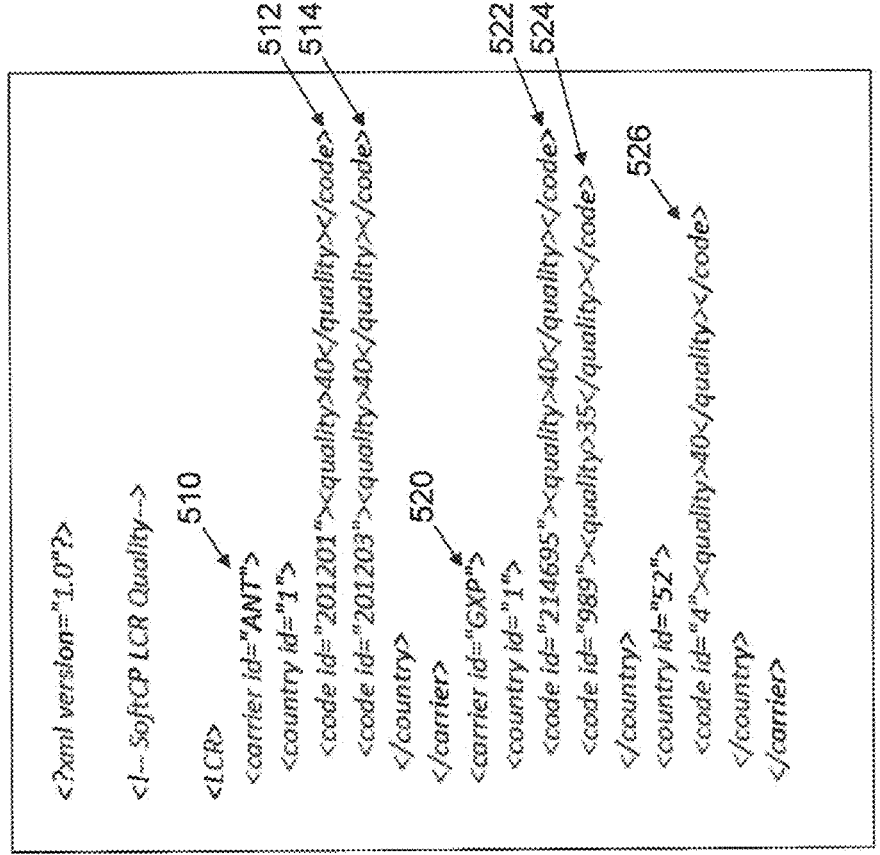
FIG. 5 is a representation of an example quality file containing quality information.

FIG. 5 provides an example quality file 500 containing quality information 512 and 514 for a carrier 510 ("ANT"), as well as quality information 522, 524, and 526 for a carrier 520 ("GXP"). The example quality file 500 indicates that the carrier 510 ("ANT") has a quality assessment value of 40 for U.S. destinations 201201 and 201203. The carrier 520 ("GXP") has quality assessment values for both U.S. and Mexico destinations. The quality assessment value can range from 1 to 100, for example, although the range is not so limited and various ranges can be used. If a quality assessment value is not assigned for the carrier destination, the quality assessment value is assumed to be 100. If a customer has not been defined, then quality filtering does not occur. If a customer has been defined but no minimum quality value has been defined, the minimum quality value is assumed to be 50, although other default minimum quality values may be used. In implementing quality filtering, the carrier code is used to locate the quality assessment value from the quality file. If the quality assessment value for the carrier is less than the minimum quality value assigned to the customer, the carrier is removed from the preliminary routing options so as not to be included in the final list of routing options.

Exclusion filtering may include routing number exclusion and tier exclusion. In routing number exclusion, a carrier may be eliminated from the final list of routing options if a routing number was used to find the preliminary routing options. The selection for routing number exclusion may be provided in a carrier definition user interface, for example.

In tier exclusion, a carrier definition can include a list of exclusion tiers that allow the carrier to be removed from the routing options if a tier identified as an exclusion tier was used to find the carrier. Tier exclusion occurs when a carrier is found using a routing tier that is present in the carrier's exclude tier list. Tier exclusion allows for a carrier to be selective and remain in the list of routing options if a specific tier was the routing tier used to find the preliminary routing options. Tier exclusion may typically work in conjunction with inherit tiers; the user may accept the carrier if the carrier is found using a primary routing tier, but if the carrier is in the list of preliminary routing options as a result of an inherit tier, then the carrier is excluded. Tier exclusion may also apply to routing options that have been identified using a default routing tier. If the initial routing tier used is identified in the carrier's tier exclusion list, the carrier is eliminated from the final list of routing options.

Dynamic revenue and cost filtering introduces revenue and cost as parameters that are used to determine if a carrier should be included in the final list of routing options. Each carrier is associated with a cost value representing a cost in units required to complete the communication session to the destination for that particular carrier. For the filtering operation, carriers whose cost to complete the communication session does not exceed a defined revenue value for the customer will be included in the final list of routing options, while those whose cost exceeds the defined revenue value are removed from the preliminary routing options so as not to be included in the final list of routing options.

Figure 6:
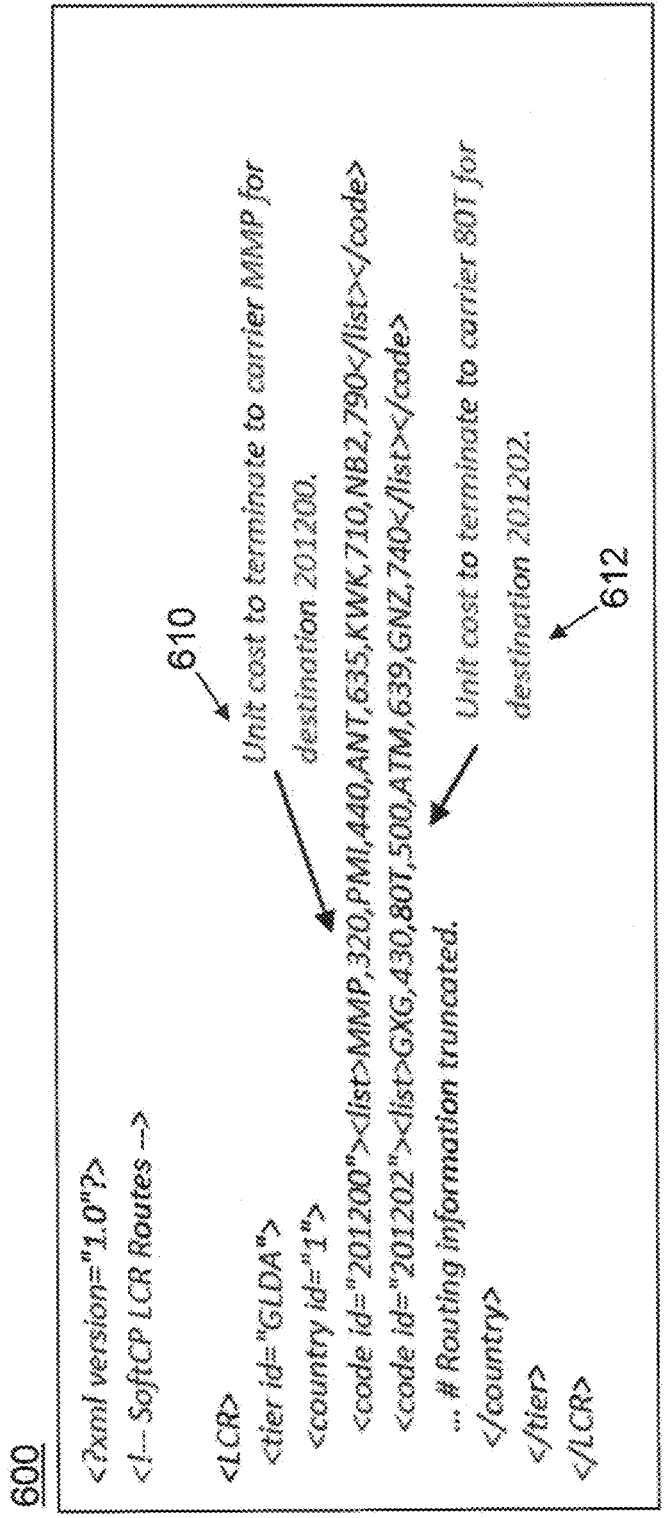
FIG. 6 is a representation of a carrier cost tier definition.

FIG. 6 is a representation of a carrier cost tier definition 600 including cost information 610 for several carriers for destination 201200 and cost information 612 for several carriers for destination 201202. For example, the unit cost to terminate to carrier MMP for destination 201200 is 320, and the unit cost to terminate to carrier 80T for destination 201202 is 500.

The units in which cost and revenue are represented may be arbitrary. A unit may be determined by, for example, determining the highest granularity required to support pricing data provided by carriers. One unit may then be less than or equal to one iteration of the highest granularity price. For example, suppose a price from a carrier is $0.0024/minute; then a unit is determined to represent one-hundredth of a cent or, in order to protect against future rates becoming more granular, then a unit may be represented as one-thousandth of a cent.

FIG. 7 is a representation of a revenue tier definition 700. A revenue tier includes units of revenue that are obtainable from a customer for a particular communication session to a destination. Revenue tiers are assigned at the customer level, and one revenue tier may be assigned per customer for each call jurisdiction. FIG. 7 shows revenue unit definitions 710, 712, 714, 716, 718, 720, and 722, with each definition indicating the revenue unit for a corresponding jurisdiction for a particular customer. When a revenue is assigned to a customer associated with the communication session, revenue and cost filtering occurs. Referring back to the customer user interface 400 of FIG. 4, the revenue section 430 provides a means for a customer to specify desired revenue criteria. One of the fields provides for entry of a margin value, and a user may specify margin as a fixed value or as a percentage of collected revenue. The specified margin value is subtracted from the revenue value for a fixed margin; while a value of one is added to the margin percentage for a percentage margin, which is then divided into the obtained revenue value. The margin value results in the routing of calls where a minimum margin may be obtained.

Revenue and cost filtering occurs when a revenue tier exists for the communication session being requested. The revenue and cost filtering process includes evaluating the preliminary routing options that remain after other filtering processes (i.e., skip filtering, quality filtering, exclusion filtering) have been implemented. The revenue units are obtained from the defined revenue tier for the customer and call jurisdiction for the particular communication session. If a margin value exists, the revenue units are reduced by the margin value to create a target cost value. The target cost value is then compared against the carriers and associated costs in the routing tier, where those carriers whose cost is below the cost target value remain in the list of preliminary routing options and those whose cost exceeds the cost target value are removed from the preliminary routing options. The revenue and cost filtering process stops when a carrier is found whose cost value exceeds the cost target value. The provisioning server 130, in order to allow the process to end when a first carrier with a cost value exceeding the cost target value is found, may be required to provide a cost ordered routing tier. The cost ordered routing tier results in significant performance gains by eliminating the need to evaluate each carrier provided in the routing tier.

If a revenue tier is found but some or all of the carriers do not have associated costs, the carriers without cost values may not be filtered during the revenue and cost filtering process. If a revenue tier is not found but costs are provided in the routing tier, then costs may be discarded, and revenue and cost filtering does not occur.

A skip out carrier may be defined to avoid the possibility of producing an empty carrier list for the querying node 110. If all of the carriers identified in the preliminary routing options are skipped due to, for example, skip filtering or any other type of filtering, a designated skip out carrier may be added to the final list of routing options so that en empty list is not provided. If a skip out carrier is not designated and no carrier are identified in the final list of routing options, an empty list, an error message, and/or a no carrier message is provided to the querying node 110.

Figure 8:
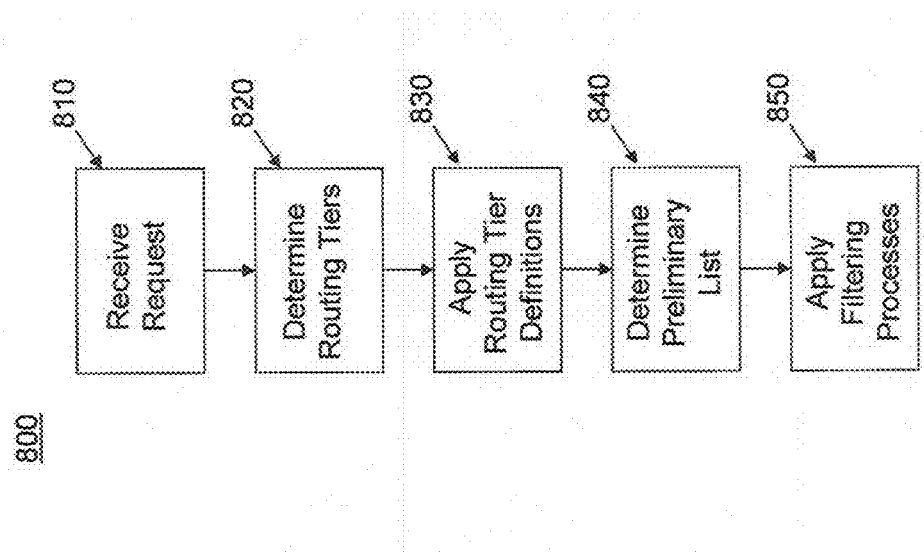
FIG. 8 is a flowchart illustrating a method of creating a list of routing options for a communication session.

FIG. 8 provides a flowchart illustrating a method 800 of creating a list of routing options for a communication session. At 810, a request for routing options for a communication session for a customer is received. The request generally includes signaling information related to the communication session, such as but not limited to a trunk group number, a local routing number, a called number, and a calling number. The request may originate from the querying node 110 and be received by the routing engine 120 through, for example, the communication interface 210. The querying node 110 may receive an original request from another node (not shown) before providing it to the routing engine 120.

With the request for routing options, the routing engine 120 operates to provide a list of routing options to satisfy the request from the querying node 110. The ability to provide the list of routing options is based, in part, on the received signaling information.

In particular, at 820 of the method 800, the routing engine 120 determines one or more routing tiers for the communication session. To determine the one or more routing tiers, the routing engine 120 uses the signaling information (i.e., the called number) to determine a call jurisdiction, in combination with additional signaling information (i.e., the trunk group number). The routing engine 120 identifies routing tiers that correspond to the signaling information (i.e., the called number and the trunk group number). The routing tiers may be identified based upon data pushed, at user-command or re-start, for example, from the provisioning server 130.

At 830, the routing engine 120 applies pre-defined routing tier definitions to the one or more determined routing tiers by altering, adding, and/or removing routing tiers based on the definitions. The result is a set of routing tiers that have been adjusted to account for the pre-defined routing tier definitions.

At 840, the routing engine 120 determines a list of preliminary routing options for the communication session. The list of preliminary routing options may be identified from one or more applicable tier load files 300 corresponding to the set of routing tiers, which may be accessed from the database 240 as provided from the provisioning server 130 as described above. A preliminary routing option in the list may correspond to a vendor that is capable of handing the requested communication session.

At 850, the routing engine 120 applies filtering processes to remove undesirable vendors from the list of preliminary routing options. The result is the list of routing options for the querying node 110. Any of the filtering processes described above, such as skip filtering, quality filtering, exclusion filtering, and revenue and cost filtering, may be implemented based on customer and/or trunk group specifications. Other filtering processes may also be implemented.

Figure 9:
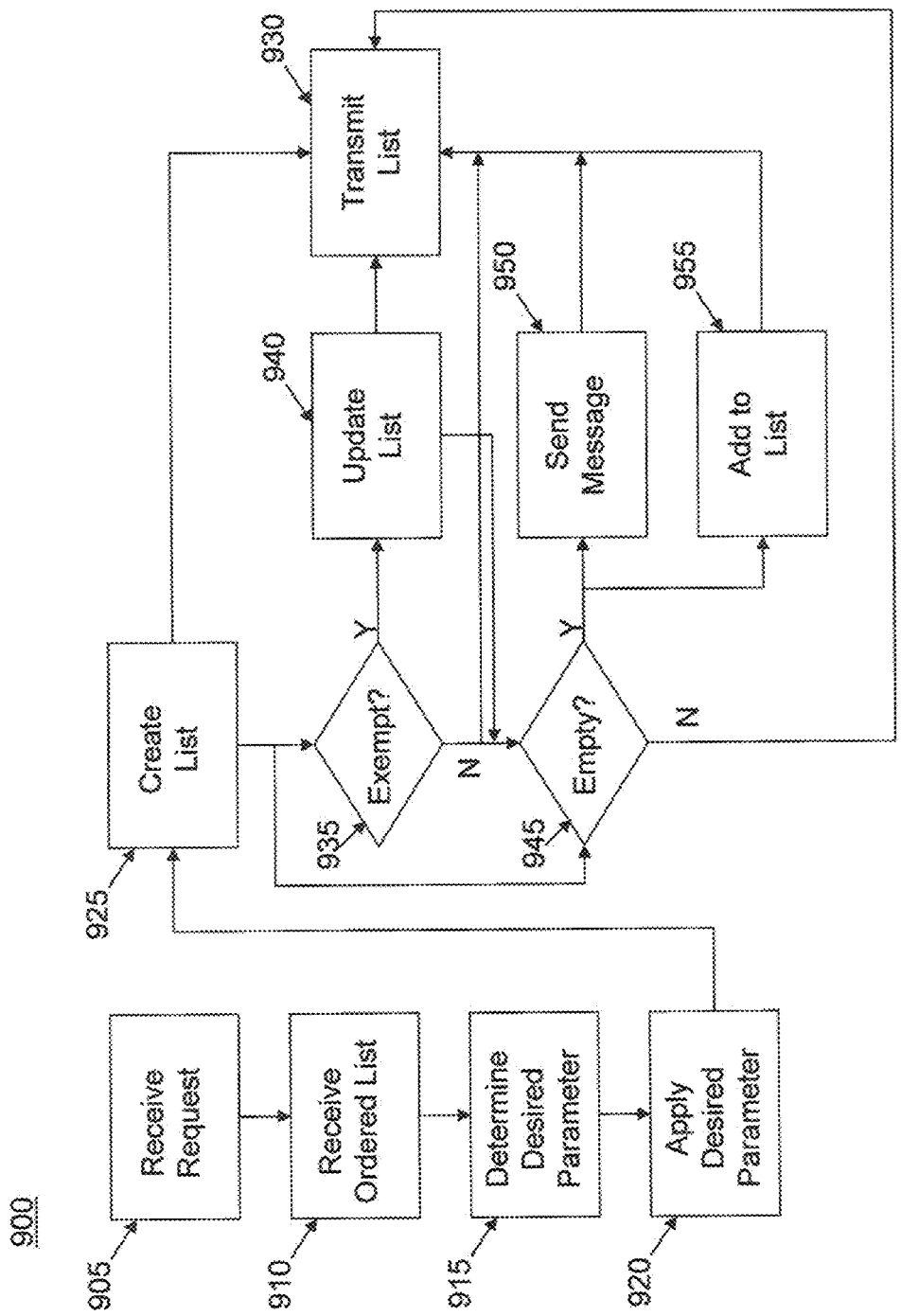
FIG. 9 is a flowchart illustrating another method of creating a list of routing options for a communication session.

FIG. 9 provides a flowchart illustrating yet another method 900 of creating a list of routing options for a communication session. At 905, a request for routing options for a communication session for a customer is received. The request may originate from the querying node 110 and be received by the routing engine 120 through, for example, the communication interface 210.

At 910, the routing engine 120 receives an ordered list of preliminary routing options. The provisioning server 130 may be required to provide the list of preliminary routing options in an ordered list. The ordered list may derive from a set of routing tiers as determined by the routing engine 120. By providing the preliminary routing options in an ordered list, various filtering processes may be implemented in a cost and time effective manner. A preliminary routing option in the ordered list may correspond to an available vendor that is capable of establishing and maintaining the requested communication session. An available vendor may be based on trunk group and call jurisdiction, for example.

At 915, a desired parameter associated with the customer and related to criteria acceptable by the customer is determined by the routing engine 120. The routing engine 120 may obtain this information from a query to the database 240, from the signaling information contained in the request for routing options, from a subsequent message from the querying node 110, or a combination thereof. The purpose of the desired parameter may be to employ filtering processes to eliminate undesirable vendors from the ordered list of preliminary routing options, for example. The desired parameter may be one or more of a revenue, a quality level, and a margin level. Other parameters may also be used.

At 920 of the method 900, the routing engine 120 applies the desired parameter to the ordered list of preliminary routing options to determine a point in the ordered list at which the desired parameter is not in compliance. Each routing option in the ordered list of preliminary routing options may be associated with a parameter value of the same type as the desired parameter associated with the customer, and the ordered list of preliminary routing options may be ordered based upon the parameter value from most desirable to least desirable. To apply the desired parameter to the ordered list of preliminary routing options, the desired parameter may be compared with the parameter value of each routing option beginning with the most desirable. Upon reaching a non-compliant routing option in the ordered list, the comparison operation ends. A non-compliant routing option is the first routing option in the ordered list with a parameter value that does not satisfy the desired parameter. Thus, by having the list of preliminary routing options ordered from most to least desirable, the comparison does not need to go through each routing option in the ordered list because when a routing option is non-compliant, the following routing options in the list will also be non-compliant based on the ordering.

At 925, the routing engine 120 creates the list of routing options for the customer, where the list of routing options includes the routing options from the ordered list of preliminary routing options that precedes the determined point. In other words, the routing options from the ordered list prior to the non-compliant routing option are included in the list of routing options.

At 930, the routing engine 120 transmits the list of routing options to the querying node 110 (i.e., the requesting node).

Optionally, at 935, prior to transmitting the list of routing options to the querying node 110 at 930, the routing engine 120 may determine one or more exempt routing options related to the customer. The exempt routing options may include vendors that the customer indicates should not be included in the list of routing options, for example. If exempt routing options exist, at 940, the list of routing options is updated to exclude the exempt routing options.

Optionally at 945, following either 925, 935, or 940 and prior to transmitting the list of routing options to the querying node 110 at 930, the routing engine 120 may determine if the routing list comprise an empty list (i.e., no identified vendors). At 950, if the routing list is an empty list, the routing engine 120 may either return a message to the querying node 110 indicating that there are no viable routing options for the communication session. Or, at 955, add a predetermined routing option to the routing list.

A revenue and cost filtering process 1000 is illustrated in the flowchart of FIG. 10. At 1010, a request for routing options for a communication session to a destination for a customer is received. The request generally includes signaling information related to the communication session, such as but not limited to a trunk group number, a local routing number, a called number, and a calling number. The request may originate from the querying node 110 (i.e., requesting node) and be received by the routing engine 120 through, for example, the communication interface 210. The querying node 110 may receive an original request from another node (not shown) before providing it to the routing engine 120.

At 1020, the routing engine 120 determines one or more routing tiers for the communication session. To determine the one or more routing tiers, the routing engine 120 uses the signaling information (i.e., the called number) to determine a call jurisdiction, in combination with additional signaling information (i.e., the trunk group number). The routing engine 120 identifies routing tiers that correspond to the signaling information (i.e., the called number and the trunk group number). The routing tiers identify the vendors capable of handling the communication session.

At 1030, the routing engine 120 determines a list of preliminary routing options for the communication session. The list of preliminary routing options may be identified from one or more applicable tier load files 300 corresponding to the routing tiers, which may be accessed from the database 240 or provided from the provisioning server 130 as described above. The list includes vendors capable of handling the communication session, with each vendor being associated with a cost value representing a cost in units required to complete the communication session to the destination.

At 1040, the routing engine 120 determines a unit of revenue associated with the customer for the communication session to the destination. This determination may include obtaining a revenue tier associated with the customer, where the revenue tier is associated with the call jurisdiction for the communication session. The revenue tier may be obtained from the database 240 or provided from the customer via, for example, the querying node 110.

At 1050, the routing engine 120 removes vendors from the list of preliminary routing options whose cost exceeds the unit of revenue associated with the customer. The remaining preliminary routing options constitute a list of routing options to be provided to the querying node 110. If vendors are not associated with a cost value, the vendors may be automatically removed from the list of preliminary routing options.

Optionally, at 1060 before 1050, a margin value and a margin type defined by the customer may be obtained by the routing engine 120. The applicable margin information may be obtained from the database 240 or provided from the customer via, for example, the querying node 110. At 1070, a target cost value associated with the customer for the communication session to the destination may be determined based on the margin value, the margin type, and the unit of revenue as described above. If the margin value and the margin type are used, then the removing of vendors from the list of preliminary routing options at 1050 includes removing vendors whose cost exceeds the target cost value.

If the preliminary routing options are arranged in a cost-ordered list in order of increasing cost value, then the removing of vendors from the list of preliminary routing options at 1050 may include evaluating vendors in the cost-ordered list beginning with a first-listed vendor and ending upon identifying a non-compliant vendor, where the non-compliant vendor is associated with a cost exceeding the unit of revenue associated with the customer. As described above, utilizing a cost-ordered list results in the benefit of evaluating only those vendors until a non-compliant vendor is found, thereby eliminating the need to evaluate each vendor in the list.

Various features of the methods 800, 900, and 1000 may be combined in a variety of manners so that certain aspects of each method may be incorporated into or with the other methods.

Other aspects may be incorporated for the routing engine 120 to generate routing options for requested communication sessions. For example, some protocols may utilize switch identifier and trunk group identifier parameters to convey vendor information. There may be, for example, up to ten pairs of switch identifiers and trunk group identifiers returned per query. These do not override the trunk group parameter that was sent with the signaling information. The parameter names contain an actual switch identifier and trunk group identifier for identifying a switch and a trunk group to use for call egress.

When SIP is used as the communication protocol, the routing engine 120 may differentiate one or more vendors by using a site insertion feature. The routing engine 120 evaluates each vendor in the list of preliminary routing options and inserts a site code when certain defined communication conditions are satisfied. The inclusion of site codes may result in the routing engine 120 reordering the list of routing options based on the site code to enable vendors to be prioritized.

Various tools are available for an operator handling and observing the behavior of the routing engine 120. One such tool relates to call detail records. If a call detail record directory is defined, call detail records may be recorded in a specified directory for each received request for routing options (i.e., query) by the routing engine 120. Information included in a call detail record may be a function of the type of signaling interface employed. Examples of the information that may be included in a call detail record include, but are not limited to, query received time, length of time to complete a query, routing tier, final list of routing options generated by the routing engine, filter types, revenue tier, and query end time.

Another tool for use by an operator is related to logging certain events to be recorded in a system file. The events that are recorded include, but are not limited to, an error event, a management write in which a user makes changes to memory or database records, a management read in which a user makes commands that do not alter memory or database records, a query logic flow event, and a signaling message. Single call tracing may be employed during the duration of a query. In single call tracing, a user sends a simulated query with a trace flag to the routing engine 120, which, upon identification or receipt of the trace flag, enables a full logic trace for the simulated query. The full logic trace allows a user to investigate the routing decisions made by the routing engine 120 without affecting other queries, without impacting performance, and with eliminating the need for the user to sort through volumes of logging information to ascertain the routing decisions made by the routing engine 120 for a particular query.

Alarm conditions are yet another tool for operator handling. When various alarm conditions arise, an operator is notified. The alarm conditions may be associated with a severity level, and each condition may be identifiable by a unique code. The conditions may depend on the type of signaling protocol employed. Examples of alarm conditions include, but are not limited to, application ready, no base directory defined, no interface defined, undefined tier attempted, undefined vendor attempted, undefined skip out carrier reference, inability to respond to querying node, and routing engine exiting.

The foregoing examples are provided merely for the purpose of explanation and are in no way to be construed as limiting. While reference to the various examples are shown, the words used herein are words of description and illustration, rather than words of limitation. Further, although reference to particular means, materials, and examples are shown, there is no limitation to the particulars disclosed herein. Rather, the examples extend to all functionally equivalent structures, methods, and uses, such as are within the scope of the appended claims.

The invention claimed is:

1. A method for creating a list of routing options for a communication session, comprising:
   receiving, from a requesting node at a routing engine, a request for routing options for a communication session for a customer, wherein the request includes signaling information related to the communication session;
   determining, at the routing engine, one or more routing tiers for the communication session, wherein the one or more routing tiers are based on the signaling information, and wherein each routing tier represents a call jurisdiction for the communication session and identifies vendors configured for handling the communication session;
   applying, at the routing engine, pre-defined routing tier definitions by one or more of altering, adding, and removing routing tiers based on the pre-defined routing tier definitions, wherein a result of applying the pre-defined routing tier definitions comprises a set of routing tiers;
   determining, at the routing engine, a list of preliminary routing options for the communication session, wherein the list of preliminary routing options comprises vendors configured for handling the communication session identified by the set of routing tiers; and
   applying, at the routing engine, filtering processes to remove undesirable vendors from the list of preliminary routing options, wherein a result of applying the filtering processes comprises a list of routing options, said filtering processes comprising:
   (i) skip filtering, wherein vendors to be removed from the list of preliminary routing options are identified;
   (ii) quality filtering, wherein a minimum quality value is defined by the customer for the communication session, wherein vendors in the list of preliminary routing options are assigned a quality assessment value, and wherein vendors whose quality assessment value does not meet the minimum quality value defined by the customer are removed from the list of preliminary routing options; (iii) routing number exclusion filtering, wherein vendors identified based on routing number are removed from the list of preliminary routing options; (iv) tier exclusion filtering, wherein a vendor specifies exclusion routing tiers, wherein if an exclusion routing tier is one of the one or more routing tiers for the communication session, the associated vendor is removed from the list of preliminary routing options; (v) revenue and cost filtering, wherein each vendor is associated with a cost value representing a cost in units required to complete the communication session, wherein a unit of revenue is associated with the customer for the communication session, and wherein vendors whose cost value exceeds the unit of revenue are removed from the list of preliminary routing options; or (vi) a combination thereof;
   wherein each of the receiving, determining, and applying steps are implemented by a processing device at the routing engine, wherein the processing device accesses instructions from a memory device, the instructions, when executed, causing each of the receiving, determining, and applying steps to be implemented.

2. The method of claim 1, wherein the signaling information comprises one or more of a trunk group number, a local routing number, a called number, and a calling number.

3. The method of claim 2, wherein determining, at the routing engine, one or more routing tiers for the communication session comprises identifying routing tiers that represent the call jurisdiction and the trunk group number for the communication session.

4. The method of claim 2, wherein the list of preliminary routing options for the communication session are identified by the set of routing tiers and one or more parameters of the local routing number or the called number.

5. The method of claim 4, wherein the parameters of the local routing number or the called number comprise country identity and destination code.

6. The method of claim 1, wherein the vendors in the list of preliminary routing options are represented by carrier codes, each carrier code associated with a switch identifier and a trunk group identifier.

7. The method of claim 1, wherein the pre-defined routing tier definitions comprise: (i) a default tier identifying pre-defined vendors for inclusion in the list of preliminary routing options; (ii) a priority tier identifying priority vendors for inclusion in the list of preliminary routing options, wherein the priority tier is a match with the signaling information related to the communication session; (iii) a modified routing tier identifying modifications for the one or more routing tiers for the communication session, wherein the modifications comprises exception entries in the one or more routing tiers; or (iv) a combination thereof.

8. The method of claim 1, wherein revenue and cost filtering is implemented following the: skip filtering, quality filtering, routing number exclusion filtering, and tier exclusion filtering.

9. A method for creating a list of routing options for a communication session, comprising:
receiving, from a requesting node at a routing engine, a request for routing options for a communication session for a customer;
receiving, at the routing engine, an ordered list of preliminary routing options for the communication session;
determining, at the routing engine, a parameter associated with the customer, wherein the parameter is related to criteria acceptable by the customer for the communication session;
applying, at the routing engine, the parameter to the ordered list of preliminary routing options via one or more filtering processes to determine a point in the ordered list of preliminary routing options at which the parameter is not in compliance, said filtering processes comprising:
(i) skip filtering, wherein vendors to be removed from the list of preliminary routing options are identified;
(ii) quality filtering, wherein a minimum quality value is defined by the customer for the communication session, wherein vendors in the list of preliminary routing options are assigned a quality assessment value, and wherein vendors whose quality assessment value does not meet the minimum quality value defined by the customer are removed from the list of preliminary routing options; (iii) routing number exclusion filtering, wherein vendors identified based on routing number are removed from the list of preliminary routing options; (iv) tier exclusion filtering, wherein a vendor specifies exclusion routing tiers, wherein if an exclusion routing tier is one of the one or more routing tiers for the communication session, the associated vendor is removed from the list of preliminary routing options; (v) revenue and cost filtering, wherein each vendor is associated with a cost value representing a cost in units required to complete the communication session, wherein a unit of revenue is associated with the customer for the communication session, and wherein vendors whose cost value exceeds the unit of revenue are removed from the list of preliminary routing options; or (vi) a combination thereof;
creating, at the routing engine, a list of routing options for the customer, wherein the list of routing options includes the routing options from the ordered list of preliminary routing options that precedes the determined point;
wherein each of the receiving, determining, applying, and creating steps are implemented by a processing device at the routing engine, wherein the processing device accesses instructions from a memory device, the instructions, when executed, causing each of the receiving, determining, applying, and creating steps to be implemented.

10. The method of claim 9, further comprising:
transmitting from the routing engine the list of routing options to the requesting node.

11. The method of claim 9, wherein each routing option in the ordered list of preliminary routing options is associated with the parameter associated with the customer.

12. The method of claim 11, wherein the ordered list of preliminary routing options is ordered based upon a parameter value.

13. The method of claim 12, wherein applying at the routing engine the parameter to the ordered list of preliminary routing options to determine a point in the ordered list of preliminary routing options at which the parameter is not in compliance comprises comparing the parameter with the parameter value of each routing option.

14. The method of claim 13, wherein comparing the parameter with the parameter value stops upon reaching a non-compliant routing option, wherein the non-compliant routing option is the first routing option in the ordered list of preliminary routing options with a parameter value that does not satisfy the parameter.

15. The method of claim 14, wherein the routing options in the ordered list of preliminary routing options prior to the non-compliant routing option are included in the list of routing options.

16. The method of claim 9, wherein the parameter comprises a revenue, a quality level, a margin level, or a combination thereof.

17. The method of claim 9, further comprising:
determining, at the routing engine, one or more exempt routing options related to the customer; and
updating the list of routing options for the customer by removing from the list the one or more exempt routing options.

18. The method of claim 9, further comprising:
determining at the routing engine if the list of routing options comprises an empty list; and
if the list of routing options is an empty list, (i) returning a message to the requesting node that no routing options are viable; or (ii) adding a predetermined routing option to the list of routing options.

19. The method of claim 9, wherein each routing option comprises an available vendor configured for establishing and maintaining the communication session.

20. The method of claim 19, wherein each of the available vendors are based on trunk group and call jurisdiction.

21. A method for creating a list of routing options for a communication session, wherein the list of routing options is based on cost and revenue, comprising:
receiving, from a requesting node at a routing engine, a request for routing options for a communication session to a destination for a customer, wherein the request includes signaling information related to the communication session;
determining, at the routing engine, a list of preliminary routing options for the communication session, wherein the list of preliminary routing options comprises vendors configured for handling the communication session, wherein each vendor is associated with a cost value representing a cost in units required to complete the communication session to the destination;
determining, at the routing engine, a unit of revenue associated with the customer for the communication session to the destination; and
removing, by applying filtering processes at the routing engine, vendors from the list of preliminary routing options whose cost exceeds the unit of revenue associated with the customer for the communication session to the destination, wherein the remaining preliminary routing options comprises a list of routing options, said filtering processes comprising:
(i) skip filtering, wherein vendors to be removed from the list of preliminary routing options are identified;
(ii) quality filtering, wherein a minimum quality value is defined by the customer for the communication session, wherein vendors in the list of preliminary routing options are assigned a quality assessment value, and wherein vendors whose quality assessment value does not meet the minimum quality value defined by the customer are removed from the list of preliminary routing options; (iii) routing number exclusion filtering, wherein vendors identified based on routing number are removed from the list of preliminary routing options; (iv) tier exclusion filtering, wherein a vendor specifies exclusion routing tiers, wherein if an exclusion routing tier is one of the one or more routing tiers for the communication session, the associated vendor is removed from the list of preliminary routing options; (v) revenue and cost filtering, wherein each vendor is associated with a cost value representing a cost in units required to complete the communication session, wherein a unit of revenue is associated with the customer for the communication session, and wherein vendors whose cost value exceeds the unit of revenue are removed from the list of preliminary routing options; or (vi) a combination thereof;

wherein each of the receiving, determining, and removing steps are implemented by a processing device at the routing engine, wherein the processing device accesses instructions from a memory device, the instructions, when executed, causing each of the receiving, determining, and removing steps to be implemented.

22. The method of claim 21, further comprising determining one or more routing tiers for the communication session, wherein the one or more routing tiers are based on the signaling information, and wherein each routing tier represents a call jurisdiction for the communication session and identifies the vendors configured for handling the communication session.

23. The method of claim 21, wherein determining, at the routing engine, a unit of revenue associated with the customer for the communication session to the destination comprises obtaining a revenue tier associated with the customer, wherein the revenue tier is associated with a call jurisdiction for the communication session.

24. The method of claim 21, further comprising:
obtaining a margin value defined by the customer; and
determining a target cost value associated with the customer for the communication session to the destination based on the margin value, and the unit of revenue;
wherein removing the vendors from the list of preliminary routing options comprises removing vendors whose cost exceeds the target cost value.

25. The method of claim 21, wherein the list of preliminary routing options is a cost-ordered list, the vendors arranged in order of increasing cost value, wherein the removing vendors from the list of preliminary routing options comprises:
evaluating the vendors in the cost-ordered list beginning with a first-listed vendor and ending upon identifying a non-compliant vendor, the non-compliant vendor associated with a cost exceeding the unit of revenue associated with the customer.

26. The method of claim 21, wherein vendors not associated with a cost value are removed from the list of preliminary routing options.

27. A routing engine for creating a list of routing options for a communication session, wherein the routing engine comprising:
one or more processors;
a communication interface configured to receive a request for routing options for a communication session for a customer, the request including signaling information related to the communication session; the communication interface further configured to receive a list of preliminary routing options for the communication session, the list of preliminary routing options comprising vendors configured for handling the communication session;
an analyzer engine configured to access filtering parameters associated with the customer, wherein the filtering parameters are related to criteria acceptable by the customer for the communication session; the analyzer engine further configured to apply the filtering parameters to the list of preliminary routing options via one or more filtering processes and to determine vendors in the list of preliminary routing options that are not in compliance with the filtering parameters, said filtering processes comprising:
(i) skip filtering, wherein vendors to be removed from the list of preliminary routing options are identified;
(ii) quality filtering, wherein a minimum quality value is defined by the customer for the communication session, wherein vendors in the list of preliminary routing options are assigned a quality assessment value, and wherein vendors whose quality assessment value does not meet the minimum quality value defined by the customer are removed from the list of preliminary routing options; (iii) routing number exclusion filtering, wherein vendors identified based on routing number are removed from the list of preliminary routing options; (iv) tier exclusion filtering, wherein a vendor specifies exclusion routing tiers, wherein if an exclusion routing tier is one of the one or more routing tiers for the communication session, the associated vendor is removed from the list of preliminary routing options; (v) revenue and cost filtering, wherein each vendor is associated with a cost value representing a cost in units required to complete the communication session, wherein a unit of revenue is associated with the customer for the communication session, and wherein vendors whose cost value exceeds the unit of revenue are removed from the list of preliminary routing options; or (vi) a combination thereof;
a compiler engine configured to create a list of routing options for the customer, wherein the list of routing options comprises the vendors in the list of preliminary routing options that are in compliance with the filtering parameters.

28. The routing engine of claim 27, wherein the analyzer engine is further configured to determine one or more routing tiers for the communication session, wherein the one or more routing tiers are based on the signaling information, and wherein each routing tier represents a call jurisdiction for the communication session and identifies the vendors configured for handling the communication session.

29. The routing engine of claim 28, wherein the signaling information comprises one or more of a trunk group number, a local routing number, a called number, and a calling number.

30. The routing engine of claim 28, wherein the analyzer engine is further configured to apply pre-defined routing tier definitions by one or more of altering, adding, and removing routing tiers based on the pre-defined routing tier definitions, wherein a result of applying pre-defined routing tier definitions comprises a set of routing tiers.

31. The routing engine of claim 27, wherein the vendors in the list of preliminary routing options are represented by carrier codes, each carrier code associated with a switch identifier and a trunk group identifier.

32. The routing engine of claim 27, wherein each vendor is associated with a cost value representing a cost in units required to complete the communication session, wherein the filtering parameters comprise revenue, and wherein a unit of revenue is associated with the customer for the communication session.

33. The routing engine of claim 32, wherein the analyzer engine applying the filtering parameters comprises removing the vendors from the list of preliminary routing options whose cost exceeds the unit of revenue associated with the customer for the communication session.

* * * * *